(12) United States Patent
Cox et al.

(10) Patent No.: US 10,562,616 B2
(45) Date of Patent: Feb. 18, 2020

(54) CLUTCH DRIVEN AIRCRAFT ELECTRIC TAXI SYSTEM AND METHOD

(71) Applicant: Borealis Technical Limited, North Plains, OR (US)

(72) Inventors: Isaiah W. Cox, London (GB); Joseph J. Cox, Portland, OR (US)

(73) Assignee: Borealis Technical Limited, Gibraltar (GI)

( * ) Notice: Subject to any disclaimer, the term of this patent is extended or adjusted under 35 U.S.C. 154(b) by 113 days.

(21) Appl. No.: 15/956,220

(22) Filed: Apr. 18, 2018

(65) Prior Publication Data

US 2018/0244375 A1    Aug. 30, 2018

Related U.S. Application Data

(62) Division of application No. 14/932,342, filed on Nov. 4, 2015, now Pat. No. 9,975,626.

(60) Provisional application No. 62/075,849, filed on Nov. 5, 2014.

(51) Int. Cl.
| | |
|---|---|
| *B64C 25/40* | (2006.01) |
| *F16D 41/12* | (2006.01) |
| *B64F 1/00* | (2006.01) |
| *F16D 41/06* | (2006.01) |

(52) U.S. Cl.
CPC ............ *B64C 25/405* (2013.01); *B64F 1/002* (2013.01); *F16D 41/06* (2013.01); *F16D 41/125* (2013.01); *Y02T 50/823* (2013.01)

(58) Field of Classification Search
CPC ..... B64C 25/405; F16D 41/06; F16D 41/125; F16D 48/06; F16D 2500/31493; F16D 2500/3108; F16D 2500/3102; F16D 2500/30806; F16D 2500/10493; F16D 2500/10412; B64F 1/002; Y02T 50/823
See application file for complete search history.

(56) References Cited

U.S. PATENT DOCUMENTS

| | | |
|---|---|---|
| 3,075,623 A | 1/1963 | Lund |
| 3,599,767 A | 8/1971 | Soderquist |
| 3,807,664 A | 4/1974 | Kelly et al. |
| 6,290,044 B1 | 9/2001 | Burgman et al. |
| 6,657,334 B1 | 2/2003 | Edelson |
| 6,838,791 B2 | 4/2005 | Edelson |

(Continued)

*Primary Examiner* — Valentina Xavier

(57) ABSTRACT

A clutch driven aircraft electric taxi system is provided with a clutch assembly designed to be automatically selectively engaged or disengaged as required to drive an aircraft autonomously during ground operations. The clutch assembly is mounted integrally with other electric taxi system components completely within an aircraft landing gear wheel and may be designed with one way overrunning or selectable clutch engagement capability in one or both rotational directions, preferably using an arrangement of ratcheting struts and clutch elements adapted specifically for use in an aircraft landing gear drive wheel environment. The clutch assembly may automatically disengage in response to predetermined defined conditions or operating parameters. A failsafe overrunning capability ensures that the clutch assembly will not engage taxi system drive components so that an aircraft's wheel will not be driven during aircraft operation when safety considerations dictate that the aircraft electric taxi system should not be engaged.

13 Claims, 1 Drawing Sheet

(56) References Cited

U.S. PATENT DOCUMENTS

| | | | |
|---|---|---|---|
| 7,116,019 B2 | 3/2006 | Edelson | |
| 7,445,178 B2 * | 11/2008 | McCoskey | B64F 1/32 244/100 R |
| 7,469,858 B2 | 12/2008 | Edelson | |
| 7,661,329 B2 * | 2/2010 | Cali | F16D 41/185 464/37 |
| 7,891,609 B2 | 2/2011 | Cox | |
| 7,980,371 B2 * | 7/2011 | Joki | F16D 41/086 192/35 |
| 8,042,670 B2 | 10/2011 | Bartos et al. | |
| 8,079,453 B2 | 12/2011 | Kimes | |
| 8,109,463 B2 | 7/2012 | Cox et al. | |
| 2009/0294577 A1 | 12/2009 | Roques et al. | |
| 2010/0006567 A1 | 5/2010 | Gyosawa | |
| 2010/0206980 A1 | 8/2010 | Cros et al. | |
| 2010/0252384 A1 | 10/2010 | Eisengruber | |
| 2011/0233026 A1 | 9/2011 | Pawley | |
| 2011/0304292 A1 * | 12/2011 | Charuel | B64C 25/405 318/450 |
| 2012/0104158 A1 | 5/2012 | Charles et al. | |
| 2012/0126053 A1 * | 5/2012 | Christensen | B64C 25/405 244/50 |
| 2013/0062151 A1 | 3/2013 | Pawley | |
| 2013/0277164 A1 | 10/2013 | Prout et al. | |
| 2014/0102848 A1 | 4/2014 | Pawley | |
| 2014/0116832 A1 * | 5/2014 | Beiser | F16D 41/14 192/54.1 |
| 2015/0151835 A1 * | 6/2015 | Cox | B64C 25/405 244/50 |
| 2019/0077500 A1 * | 3/2019 | Kipp | B64C 25/426 |
| 2019/0217947 A1 * | 7/2019 | Cox | B64C 25/405 |

* cited by examiner

CLUTCH DRIVEN AIRCRAFT ELECTRIC TAXI SYSTEM AND METHOD

PRIORITY CLAIM

This application is a divisional of U.S. patent application Ser. No. 14/932,342, filed 4 Nov. 2015, which claims priority from U.S. Provisional Patent Application No. 62/075,849, filed 14 Nov. 2014, the disclosures of which are fully incorporated herein.

TECHNICAL FIELD

The present invention relates generally to aircraft electric taxi systems and specifically to a controllable clutch driven aircraft electric taxi system designed to selectively engage an electric taxi system to drive an aircraft during ground operations and a method for selectively and safely operating a clutch driven aircraft electric taxi system.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become a high priority in the management of airport ground operations. The safe and efficient ground movement of a large number of aircraft simultaneously into and out of ramp and gate areas has become increasingly important. As airline fuel costs and safety concerns and regulations have increased, the airline industry is beginning to acknowledge that continuing to use an aircraft's main engines, even at low thrust settings, to move aircraft during ground operations is no longer the best option. The delays, costs, and other challenges to timely and efficient aircraft pushback from airport terminals associated with the use of tugs and tow vehicles makes this type of aircraft ground movement an unattractive alternative to the use of an aircraft's main engines to move an aircraft on the ground. Restricted use of an aircraft's engines on low power during arrival at or departure from a gate is an additional, although problematic, option. Not only does such engine use consume fuel, it is also burns fuel inefficiently and produces engine exhaust that contains microparticles and other products of incomplete combustion. Operating aircraft engines, moreover, are noisy, and the associated safety hazards of jet blast and engine ingestion in congested gate and ramp areas are significant concerns that cannot be overlooked.

The use of landing gear motors and drive systems to drive aircraft autonomously during ground operations has been proposed by applicants and others, and a range of such motors and systems is described in the art. U.S. Pat. No. 7,469,858 to Edelson; U.S. Pat. No. 7,891,609 to Cox; U.S. Pat. No. 7,975,960 to Cox; and U.S. Pat. No. 8,109,463 to Cox et al., owned in common with the present invention, describe aircraft drive systems that use electric drive motors to power aircraft wheels and move an aircraft autonomously on the ground without reliance on aircraft main engines or external vehicles. U.S. Pat. No. 3,807,664 to Kelly et al. and U.S. Pat. No. 7,445,178 to McCoskey et al. describe aircraft wheel drive systems that use, respectively, hydraulic or electric motors to drive aircraft during taxi. U.S. Patent Application Publication Nos. US2009/0294577 to Rogues et al; US2010/0206980 to Cros et al.; US2011/0304292 to Charuel et al.; and U.S. Patent Application Publication No. US2012/0104158 to Charles et al. additionally describe various aircraft drive devices and motors controllable to move aircraft during ground operations. While the use of coupling elements or clutches is suggested in some of the foregoing aircraft wheel drive systems, it is not suggested that these coupling elements or clutches could be structured or function to automatically avoid engagement of the wheel drive system when the system should not be engaged, nor is it suggested that coupling element or clutch function could or should be enabled at defined drive modes, speeds, or other operating parameters.

U.S. Patent Application Publication No. US2010/0065678 to Kiyosawa describes a self-propelled wheel apparatus with a coaxially linked motor, wave gear, and a one-way clutch to drive an aircraft on the ground. The clutch in the Kiyosawa system, however, is stated to transmit rotational force to move the aircraft only in a reverse direction and to cause the wheel to rotate only when the aircraft moves backward. Such a clutch design could not function effectively to enable aircraft autonomous movement during all ground operations, including taxiing or movement in both forward and reverse directions, between landing and take off.

Automotive and like vehicle clutch assemblies that may be selectively engaged or disengaged are well known in the art. U.S. Pat. No. 3,075,623 to Lund; U.S. Pat. No. 3,599,767 to Soderquist; and U.S. Pat. No. 7,661,329 to Cali et al., for example, describe clutch assemblies incorporating sprag or pawl elements that may transmit torque between races or rotatable elements depending, in part, on their relative directions of rotation. One way vehicle clutches designed to lock in one direction and allow free rotation in the opposite direction are also available, as are improved selectable one way clutch designs, such as those described in U.S. Pat. No. 6,290,044 to Burgman et al.; U.S. Pat. No. 7,980,371 to Joki; and U.S. Pat. No. 8,042,670 to Bartos et al. Various other selectable clutch designs that provide controllable overrunning and coupling functions in automotive automatic transmissions, are described in U.S. Pat. No. 8,079,453 to Kimes and in U.S. Patent Application Publication Nos. US2010/0252384 to Eisengruber; US2011/0233026, US2013/0062151, and US2014/0102848 to Pawley; US2013/0277164 to Prout et al.; and US2014/0116832 to Beiser et al. While these clutch designs may function effectively in an automotive wheel environment, an aircraft landing gear drive wheel environment is significantly different and poses safety and other considerations that do not accompany the operation of automotive and like vehicles. Neither the foregoing clutch designs nor other commonly available clutch designs are sufficiently robust to function effectively and reliably in an aircraft landing gear drive wheel environment. It is not suggested that any of the foregoing clutch designs may be adapted to selectively and automatically transfer torque as required during operation of an aircraft electric taxi system in response to selected operating or other parameters. Nor is it suggested that these clutch designs are or could be adapted to avoid engagement of a drive system when it should not be engaged. Moreover, the clutches noted above do not provide the kind of failsafe capability that ensures that the clutch will never be engageable during flight, landing, takeoff, or during any other aircraft operating condition when operation of an electric taxi system would be unsafe.

A need exists for a clutch assembly adapted to function effectively and safely in an aircraft landing gear drive wheel drive system environment as an integral component of an aircraft electric taxi system. A additional need exists for a clutch assembly designed to automatically and selectively engage a drive motor to transfer torque and drive an aircraft drive wheel and move the aircraft autonomously on the ground only at predetermined speeds or operating conditions and/or in selected drive modes in a desired direction. A need also exists for a clutch assembly designed with a failsafe capability ensuring that the clutch assembly will never be engageable to activate the electric taxi system when aircraft operating conditions indicate that system operation is unsafe.

SUMMARY OF THE INVENTION

It is a primary object of the present invention, therefore, to provide an aircraft electric taxi system with a clutch assembly adapted to function effectively and safely in an aircraft landing gear drive wheel drive system environment as an integral component of an aircraft electric taxi system.

It is another object of the present invention to provide an aircraft electric taxi system with a clutch assembly designed to automatically and selectively engage a drive motor to transfer torque and drive an aircraft drive wheel and move the aircraft autonomously on the ground only at predetermined speeds or operating conditions and/or in selected drive modes in a desired direction.

It is an additional object of the present invention to provide an aircraft electric taxi system with a clutch assembly designed to fit completely within the operational profile of an aircraft landing gear drive wheel that is operatively coupled to taxi system components to automatically and selectively transfer torque to system components only when required to drive the drive wheel and move the aircraft autonomously in a commanded direction during taxi.

It is a further object of the present invention to provide an aircraft electric taxi system with a clutch assembly with one way selectable clutch elements integrally coupled to an aircraft drive wheel drive system mounted within an aircraft landing gear wheel that automatically transfers torque through drive system components selectively when required to engage drive system components or to disengage drive system components in response to predetermined operating parameters.

It is a further object of the present invention to provide an aircraft electric taxi system incorporating a clutch assembly with a failsafe overrunning capability designed to ensure that the taxi system is never engaged when the aircraft is in flight, during landing or takeoff, and at other times when the taxi system should not be operational.

In accordance with the aforesaid objects, a clutch driven aircraft electric taxi system is provided. The electric taxi system includes a clutch assembly that is designed to selectively and controllably transfer torque to system components to drive an aircraft autonomously during ground operations only in response to predetermined system or aircraft operating parameters and conditions in a desired direction. The clutch assembly is mounted integrally with other electric taxi system components completely within defined space available in an aircraft landing gear wheel where the clutch assembly can be selectively engaged and/or disengaged as required. The clutch assembly may be designed with one way overrunning or selectable clutch engagement capability in one or both rotational directions, preferably using an arrangement of ratcheting struts and other clutch elements adapted specifically for use in an aircraft landing gear drive wheel environment. The clutch assembly may be designed to operate differently when rotating in a forward direction or drive mode than in a reverse direction or drive mode. The clutch assembly additionally may have the capability to automatically disengage in response to predetermined defined conditions or operating parameters, for example motor speed or drag detected outside such defined conditions or parameters. A failsafe overrunning capability ensures that the clutch assembly will not engage taxi system drive components so that an aircraft's wheel will not be driven when the aircraft is in flight, during landing and takeoff, and at other times during aircraft operation when safety considerations dictate that the aircraft electric taxi system should not be engaged.

Other objects and advantages will be apparent from the following description, claims, and drawings.

DESCRIPTION OF THE INVENTION

The benefits of being able to efficiently and safely move an aircraft during ground operations without reliance on the aircraft's main engines or external vehicles have been recognized. Actually achieving these benefits, however, has proved challenging. Applicant's previously proposed aircraft electric taxi systems have been demonstrated to effectively power drive wheels and move aircraft on the ground and, thus, can enable aircraft operators to achieve the many advantages of autonomous ground movement. The present invention improves the capabilities of Applicant's original aircraft electric taxi system and expands the advantages possible when aircraft can be driven autonomously during ground operations independently of the aircraft's main engines and external ground vehicles. These advantages and improvements are achieved, in large part, by the design of an aircraft electric taxi system that incorporates a clutch assembly, selectively engageable as described herein, to transfer torque and control operation of the electric taxi system as required to safely drive an aircraft landing gear wheel and move the aircraft during taxi.

"Aircraft electric taxi system," as used herein, refers to a system of aircraft drive components, including an electric drive motor to provide motive force, typically mounted with an aircraft nose or main landing gear wheel and designed to drive the aircraft nose or main landing gear wheel and move the aircraft autonomously during taxi and other ground operations without operation of an aircraft's main engines or assistance from external tow vehicles.

Figure 1:
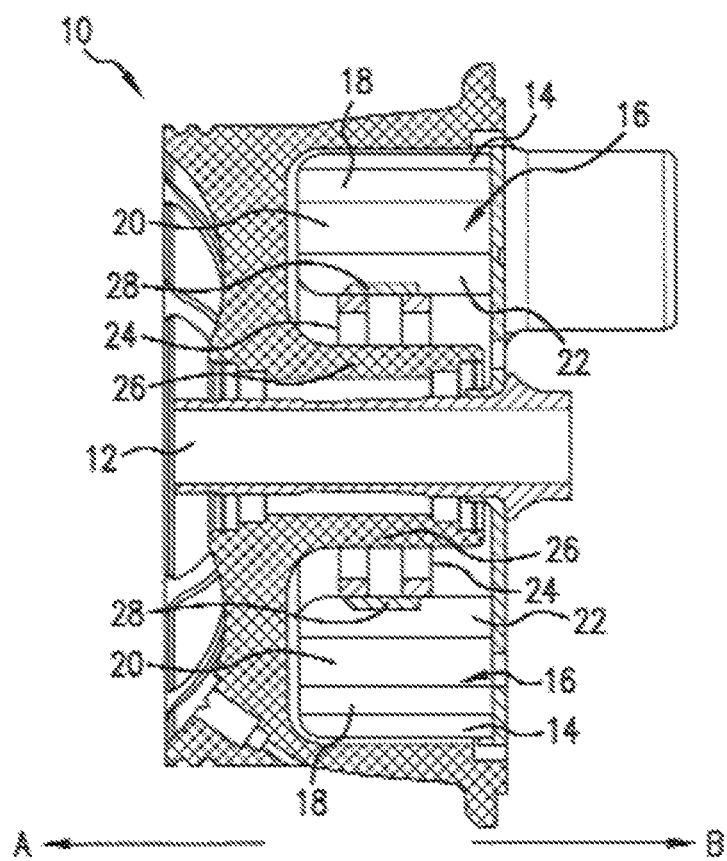
FIG. 1 is a cross-sectional diagrammatic view of a clutch driven aircraft electric taxi system in accordance with the present invention mounted in an aircraft landing gear wheel.

Referring to the drawings, which are not necessarily drawn to scale, FIG. 1 shows, in cross-sectional diagrammatic view, a clutch driven aircraft electric taxi system in accordance with the present invention mounted within an aircraft landing gear wheel 10. The outboard portion of the wheel is in the direction of the arrow A, and the inboard portion of the wheel is in the direction of the arrow B. For clarity, an outboard portion of the wheel's tire mounting structure, which may be a demountable flange, and a tire are not shown. The aircraft's landing gear piston and associated inboard structures are also not shown. The wheel 10 is mounted for rotation about an axle 12. An interior space or recess 14 defined within the inboard and outboard extent of the walls of the wheel 10 may accommodate all of the components of the electric taxi system. The electric taxi system components include an electric drive motor 16, which typically has a stationary stator element 18 and a rotating rotor element 20, and a drive system 22. A clutch assembly 24 may be positioned between the drive system and a wheel section 26 adjacent to the axle 12. A clutch input 28 may activate the drive system 22. The relative arrangement of components shown in FIG. 1 is only one possible arrangement. Other arrangements of motor components, drive system, and clutch are also contemplated to be within the scope of the present invention.

An electric motor preferred as a component of the clutch driven electric taxi system of the present invention is an electric motor that may be any one of a number of suitable designs. For example and without limitation, a high phase order electric motor of the kind described in commonly owned U.S. Pat. Nos. 6,657,334; 6,838,791; 7,116,019; and 7,469,858, the disclosures of the aforementioned patents being fully incorporated herein by reference, may be effectively used for electric taxi of an aircraft. A range of other motor designs, whether with an inner rotor as shown in FIG. 1 or with an outer rotor relative to a stator, capable of high torque operation across a desired speed range that can drive an aircraft landing gear wheel to move an aircraft autonomously on the ground may also be suitable and are contemplated to be within the scope of the present invention.

The drive system 22 may be a system of gears or another type of drive system capable of transmitting torque from a clutch input 28 between a clutch assembly, such as clutch assembly 24, and a motor 16. A roller traction type of drive system that is designed to actuate an electric drive motor capable of moving a commercial sized aircraft on the ground not only may have a low profile and be light weight, but it may also provide the high torque and high speed change ratio required to optimally operate the motor to move an aircraft on the ground. Either type of drive system may be effectively used in the clutch driven electric taxi system of the present invention, and these and other types of drive systems are contemplated to be within the scope of the present invention.

The clutch assembly 24 preferred for the present clutch driven electric taxi system may have overrunning and one way clutch operation features and must be sufficiently robust to function to automatically and selectively transfer operational torque in an aircraft landing gear environment to components of a drive system designed to drive an aircraft landing gear wheel and move an aircraft during ground operations. Engagement of the clutch assembly must be avoided or prevented when it should not be engaged. A suitable clutch assembly should also be automatically disengageable to physically separate components of an electric taxi system from other aircraft functions so that these components do not impact such aircraft functions as landing, taxiing, take off, flight, and the like. The clutch input 28, for example, must automatically disconnect from any torque transferring contact with the drive system 22 whenever the electric taxi system should not be operational. Additionally, a preferred clutch assembly must enable forward drive and reverse drive up to predetermined defined maximum speeds for each drive mode. These predetermined defined maximum forward and reverse speeds may be determined based on aircraft type, drive system components, and other factors.

A preferred clutch assembly for a clutch driven electric taxi system in accordance with the present invention must also be able to prevent aircraft ground speed from slowing at any forward speed when the clutch assembly is operating in a forward drive setting or drive mode. When the clutch assembly is operating in a forward drive setting, without a commanded disconnection from an active drive mode at a speed less than a predetermined defined maximum speed, an overrunning function must be enabled when the predetermined defined maximum speed is exceeded. Further, when aircraft speed exceeds a second defined maximum speed greater than the predetermined maximum speed, the clutch must automatically disengage completely. In this case, the clutch input 28 would not be in contact with the drive system 22.

When an aircraft is to be driven in reverse, the electric taxi system, and the clutch assembly, must be specifically enabled to drive the aircraft in reverse. The default drive mode is forward. The reverse drive mode is activated only when this is commanded, with reverse drive mode activation designed to be achieved as reliably as possible.

It is contemplated that the clutch assembly may be automatically engageable and disengageable in response to a simple electronic command, for example that provided by a solenoid type of activation in response to sensors and/or actuators associated with the clutch assembly. Although automatic operation of the clutch assembly is preferred, the clutch assembly may also be engaged and disengaged manually, if necessary. A commanded wheel spin in a reverse direction may additionally be used to disengage the clutch assembly.

The clutch assembly 24 is designed to be an integral component of the electric taxi system of the present invention, and the electric taxi system is configured to be fitted completely within the dimensions of the space defined within the inboard and outboard boundaries of an aircraft landing gear wheel. Therefore, the clutch may be easily removed and replaced when the electric taxi system is removed and replaced during routine or other maintenance.

While it is contemplated that a preferred location for the clutch driven electric taxi system described herein may be within one or both aircraft nose landing gear wheels, this clutch driven electric taxi system may also be installed within other aircraft wheels, including main landing gear wheels.

A preferred clutch assembly that meets the aforementioned requirements to automatically, effectively, and safely drive an electric taxi system to move an aircraft during ground operations may include clutch elements that enable the clutch assembly to function as a controllable selectable one way clutch with an overrunning capability. While Means Industries, Inc. of Saginaw, Mich. has supplied clutches that may achieve these functions to the automotive industry, this type of clutch assembly has not heretofore been proposed or adapted to be integrated into an aircraft electric taxi system to actuate system components and drive an aircraft landing gear drive wheel to drive the aircraft during ground operations. As noted above, the design considerations for automotive and aircraft landing gear clutch assemblies differ significantly. For example, the speed of clutch assembly components in an aircraft electric taxi system are orders of magnitude greater than in automotive or like vehicular applications and would require a "super" overrunning function not present in available clutches. The drag created on clutch components at such speeds, moreover, would produce unacceptable wear on struts and other clutch elements.

A clutch assembly contemplated for driving an electric taxi system according to the present invention may lock in one direction while allowing free rotation in an opposite direction. Torque is transferred from a driving element to a driven element during rotation of the elements. Typically, an overrunning clutch assembly permits torque transfer while permitting free wheeling motion of a driving member relative to a driven member when torque transfer is interrupted. A clutch assembly may include a clutch element referred to as a pocket plate, with recesses or "pockets" in a planar surface that hold spring biased torque transmitting struts or pawls and a notch plate with openings or notches corresponding to the locations of the pockets when the pocket plate and notch plate are aligned. The struts may be held below the pocket plate planar surface to permit rotation of the notch plate or other rotating clutch elements and spring biased to project above the pocket plate planar surface to engage a corresponding notch in the notch plate, thereby causing the pocket plate and notch plate to rotate together at the same speed. Centrifugal force produced during rotation may overcome the spring force of the biasing springs at a set speed, causing the struts to disengage from the notch plate notches and permitting the pocket and notch plates to rotate relative to each other and the struts to ratchet against the notch plate or related structures. A clutch assembly may also include a control plate positioned between the pocket plate and the notch plate configured to cover selected notches and prevent engagement of the struts at the selected locations.

Figure 2:
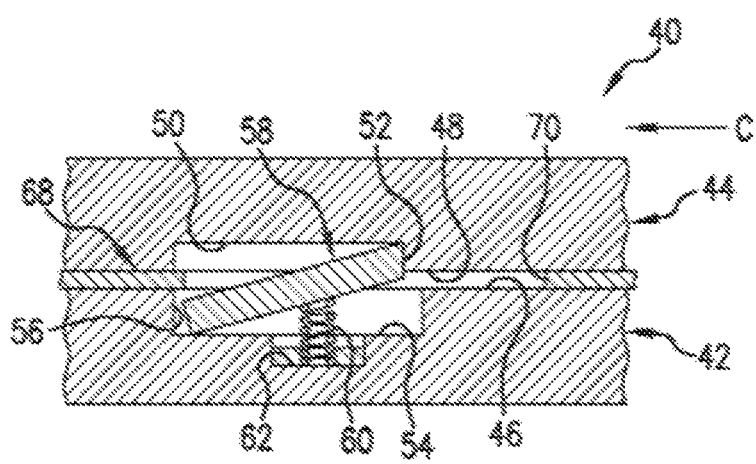
FIG. 2 is a cross-sectional diagrammatic view of a portion of a clutch assembly showing the main elements in a prior art controllable or selectable clutch assembly that may be adapted to controllably drive an aircraft landing gear electric taxi system to move an aircraft during ground operations.

FIG. 2 illustrates a diagram of a cross section of a portion of a prior art clutch assembly 40 adapted to drive an aircraft electric taxi system according to the present invention. The clutch assembly may include a pocket plate 42 and a notch plate 44 with respective coupling faces 46 and 48. At least one of the pocket plate 42 or the notch plate 44 rotates about an axis, such as wheel axle 12 in FIG. 1, in a direction indicated by arrow C. The coupling face 48 of the notch plate 44 has a plurality of spaced recesses or pockets 50, only one of which is shown, each of which may include a load-bearing shoulder 52. The coupling face 46 of the pocket plate 42 has at least one recess 54 with a load-bearing shoulder 56. A strut or pawl 58, which functions as a locking element, is shown biased into engagement with the notch plate shoulder 52 by a spring 60 located in a small recess 62 below the recess 54. The strut 58 is moveable between the locked position engaging the shoulder 52 of the notch plate pocket or notch 50 and an unlocked position in which the strut 58 occupies the recess 54 and does not extend above the face 46 of the pocket plate 42. A control plate 68, which may be in the form of an apertured selector plate with at least one opening 70, is position between the pocket plate 42 and the notch plate 44. The control plate operates to cover or uncover a selected notch 50, blocking or permitting access to the notch by a strut 58. As the control element rotates, each strut applies force on the control element produced by the force of the spring 60 biasing the strut 58 toward the control plate.

The strut 58 shown in FIG. 2 is shown in an engaged position that will prevent the relative rotation of the pocket plate 42 and the notch plate 44. The entire clutch assembly will rotate in the direction of the arrow C. Rotation of the pocket plate 42 or the notch plate 44 in a direction opposite to that of arrow C will cause the strut 58 to ratchet against the edge of the notch 50 opposite the shoulder 52.

The arrangement of clutch assembly elements shown in FIG. 2 is meant to be illustrative and not limiting. A clutch that is safe and effective for driving an aircraft electric taxi system may include some or all of the elements shown or additional elements that have been specifically adapted for optimal function in driving an aircraft electric taxi system that meets the requirements described above. For example, struts may have a different configuration and may be biased by one or more springs or other elements. The biasing force exerted by one or more springs to move a strut into locking engagement with a notch plate may be set to be overcome by centrifugal force at a defined rotational speed to prevent engagement and to reduce drag and associated wear on struts and other structures.

It is contemplated that a suitable clutch assembly may operate automatically so that complete disengagement may occur automatically. It is further contemplated that sensors may be used to provide information such as motor speed measurements and to compare this information with wheel speed or other information that may be used to determine whether automatic disengagement of the clutch assembly elements is required. Strut springs, for example, could be automatically activated or deactivated by solenoids or the like to move struts into or out of engagement with a notch plate. As indicated above, there are situations in which an electric taxi system should never be engaged, and the clutch assembly can be controlled automatically to ensure that the system is disengaged and remains disengaged during these situations.

A suitable clutch assembly for the present invention may retain at least some manual operation. For example, when an aircraft is to be driven in a forward direction by a clutch driven electric taxi system, the clutch assembly may be designed to be not selectable with a one-way override. When the aircraft is to be driven in a reverse direction, a different mechanism may be more appropriate. Additionally, automatic operation of the clutch may be used to drive an aircraft in a forward direction, while manual operation to positively activate the clutch assembly is required to drive the aircraft in a reverse direction. Reversing an aircraft would require pilot operation of the clutch assembly to drive the electric taxi system to move the aircraft in a desired reverse direction. It is contemplated that suitable cockpit controls may be provided to permit manual operation of the clutch assembly by an aircraft's pilot or cockpit crew.

Engagement and disengagement of the clutch assembly 24, 40 could be targeted to the speed of the aircraft wheel 10 and/or to speeds of electric taxi system components, including the speed of the motor 16 and/or drive system 22, as well as to predetermined environmental or other conditions. It is preferred that the present clutch driven electric taxi system include one or more failsafe mechanisms, such as, for example, a failsafe overrunning capability in the clutch assembly 24, 40, to prevent the clutch assembly from transferring torque to engage or actuate the drive system 22 when the aircraft landing gear wheels are not supporting the aircraft on the ground, such as, for example, when the aircraft is in flight and at other times when an aircraft landing gear wheel should not be driven. The clutch assembly described herein may be adapted to be selectively engaged in both forward and reverse rotational directions, as well as with a failsafe overrunning capability to safely drive an aircraft electric taxi system.

It is further contemplated that a clutch assembly as described above may be actuated by a hydraulic actuator, an electromagnetic actuator, or any other actuating system available for this purpose that may be automatically or manually controlled to produce a control force to engage or disengage, as appropriate, an aircraft drive wheel drive system to transmit drive torque to the system as required to drive the aircraft in a forward or reverse direction during movement on a ground surface.

It is preferred that the various plates, struts, biasing springs, and other components of the clutch assembly described above have configurations and be made of materials designed to withstand high torque loads, preferably torque loads in excess of a determined maximum torque load likely to be encountered by an aircraft electric taxi system and that the materials are demonstrated to be capable of effective long term operation in an aircraft or aerospace environment.

While the present invention has been described with respect to preferred embodiments, this is not intended to be limiting, and other equivalent arrangements and structures that perform the required functions are contemplated to be within the scope of the present invention.

INDUSTRIAL APPLICABILITY

A clutch driven aircraft electric taxi system with a selectively engageable and controllable clutch assembly designed to safely drive an aircraft electric taxi system to move an aircraft autonomously during ground operations will find its primary applicability where it is desired to realize the benefits of controlling movement of an aircraft safely and efficiently on the ground without reliance on the aircraft's main engines or external ground vehicles.

The invention claimed is:

1. A clutch driven aircraft electric taxi system for moving an aircraft autonomously during ground operations comprising:
   a. an aircraft landing gear wheel rotatably supporting a wheel drive system on an axle completely within a space defined by inboard and outboard boundaries of the wheel;
   b. an electric taxi drive system configured to generate and transmit torque required to drive the landing gear wheel and move the aircraft autonomously during ground operations, comprising an electric motor and a drive system in actuating torque transfer contact with said electric motor;
   c. a selectively controllable clutch assembly in torque coupling contact with said drive system, said clutch assembly comprising at least a torque coupling element and a plurality of engagement elements structured to be automatically engageable or disengageable in response to predetermined operating parameters and conditions of said electric taxi drive system and said aircraft during ground operations, wherein said predetermined operating parameters and conditions comprise aircraft speed, aircraft forward drive mode, aircraft reverse drive mode, and an aircraft default drive mode; and
   d. automatic and manual controls in control communication with said clutch assembly to engage said torque coupling element and said plurality of engagement elements only when said electric taxi system may be safely operated to move said aircraft on the ground.

2. The system of claim 1, wherein said clutch assembly further comprises a first rotatable element and a second rotatable element, and each of said plurality of engagement elements is supported in a recess on said first rotatable element and controllably spring biased to engage a correspondingly positioned notch in said second rotatable element to transfer torque from said clutch assembly to said drive system or not to engage said correspondingly configured notch in said second rotatable element, preventing torque transfer from said clutch assembly to said drive system.

3. The system of claim 1, wherein said clutch assembly comprises a one-way clutch assembly or a selectable clutch assembly.

4. The system of claim 1, wherein said drive system comprises a system of gears or a roller traction drive system.

5. The system of claim 1, wherein said clutch assembly is coupled in automatically controllable torque transfer relationship with said drive system to be engageable or disengageable when said predetermined operating parameters of said electric taxi drive system and said aircraft are reached or exceeded.

6. The system of claim 5, wherein said clutch assembly is configured to be automatically controllable when the aircraft is in a forward drive mode and only manually controllable when the aircraft is in a reverse drive mode.

7. The system of claim 1, wherein said clutch assembly further comprises a clutch input element movable out of torque coupling contact with said drive system when said clutch assembly is in an overrunning mode.

8. The system of claim 1, further comprising an automatically activatable failsafe control in said automatic controls in control communication with said clutch assembly, with said torque coupling element, and with said plurality of engagement elements.

9. The system of claim 1, wherein said aircraft default drive mode is forward drive.

10. The system of claim 3, wherein said first rotatable element comprises a pocket plate with said recesses in a planar surface of said pocket plate each holding an engagement element comprising a strut or pawl spring biased to project above said planar surface, said second rotatable element comprises a notch plate with said correspondingly positioned notches, and said strut or pawl engages said corresponding notch when said pocket plate and said notch plate are aligned.

11. The system of claim 10, further comprising a rotatable control plate positioned between said pocket plate and said notch plate configured to cover selected notches and prevent engagement of said struts or said pawls at said selected notches.

12. The system of claim 1, wherein said clutch assembly further comprises a first rotatable element and a second rotatable element comprising, respectively, a planar pocket plate and a planar notch plate, each of said plurality of engagement elements comprises a controllably spring biased strut or pawl supported in a recess in said planar pocket plate and positioned to engage a corresponding notch in said planar notch plate and a rotatable control plate interposed between said planar pocket plate and said planar notch plate to selectively prevent engagement of said strut or pawl in selected notches.

13. The system of claim 1, wherein said clutch assembly is positioned between said drive system and a section of said aircraft landing gear wheel adjacent to said axle.

* * * * *